US011919286B2

(12) United States Patent
Hallman (10) Patent No.: US 11,919,286 B2
(45) Date of Patent: Mar. 5, 2024

(54) TRANSACTION CARDS AND SYSTEM (71) Applicant: AmaTech Group Limited, Galway (IE)

(72) Inventor: H. Russell Hallman, Thomasville, NC (US)

(73) Assignee: AmaTech Group Limited, Spiddal (IE)

( * ) Notice: Subject to any disclaimer, the term of this patent is extended or adjusted under 35 U.S.C. 154(b) by 168 days.

(21) Appl. No.: 17/764,813

(22) PCT Filed: Sep. 29, 2020

(86) PCT No.: PCT/US2020/053198
§ 371 (c)(1),
(2) Date: Mar. 29, 2022

(87) PCT Pub. No.: WO2021/067222
PCT Pub. Date: Apr. 8, 2021

(65) Prior Publication Data
US 2022/0339908 A1   Oct. 27, 2022

Related U.S. Application Data

(60) Provisional application No. 62/908,179, filed on Sep. 30, 2019.

(51) Int. Cl.
*G06K 19/077* (2006.01)
*B32B 3/08* (2006.01)
*B32B 7/12* (2006.01)
*B32B 27/08* (2006.01)
*B32B 27/10* (2006.01)
(Continued)

(52) U.S. Cl.
CPC .................. *B32B 7/12* (2013.01); *B32B 3/08* (2013.01); *B32B 27/08* (2013.01); *B32B 27/10* (2013.01);
(Continued)

(58) Field of Classification Search
CPC ........ G06K 19/07722; G06K 19/07749; B32B 7/12; B32B 27/08
USPC ......................................... 235/488
See application file for complete search history.

(56) References Cited

U.S. PATENT DOCUMENTS 5,679,440 A * 10/1997 Kubota ................... B32B 27/08
428/209
5,837,380 A * 11/1998 Choi ....................... H05K 1/028
428/480

(Continued)

FOREIGN PATENT DOCUMENTS

JP         6451280 B2    1/2019

OTHER PUBLICATIONS

PCT International Search Report and Written Opinion for PCT Patent Application No. PCT/US2020/053198 dated Feb. 26, 2021. 12 Pages.

(Continued)

*Primary Examiner* — Paultep Savusdiphol
(74) *Attorney, Agent, or Firm* — McAndrews, Held & Malloy, Ltd.

(57) ABSTRACT

Transaction and proximity cards having an improved construction and systems for utilizing such cards. The card system includes a card having only one top ply and only one bottom ply and a layer of high elongation adhesive between each of the only one top ply and the only one bottom ply. In one card embodiment, the card further includes at least one inlay between the only one top ply and the only one bottom ply and a layer of high elongation adhesive between each of the only one top ply and the only one bottom ply and the at least one inlay. In addition, the transaction card system includes card dispensers adapted to dispense the cards.

20 Claims, 11 Drawing Sheets

(51) Int. Cl.
  *B32B 27/30* (2006.01)
  *B32B 27/32* (2006.01)
  *B32B 27/36* (2006.01)
  *B32B 29/00* (2006.01)
  *C09J 175/04* (2006.01)
(52) U.S. Cl.
  CPC ............ *B32B 27/304* (2013.01); *B32B 27/32* (2013.01); *B32B 27/36* (2013.01); *B32B 29/005* (2013.01); *C09J 175/04* (2013.01); *G06K 19/07722* (2013.01); *G06K 19/07728* (2013.01); *B32B 2255/10* (2013.01); *B32B 2255/12* (2013.01); *B32B 2270/00* (2013.01); *B32B 2307/54* (2013.01); *B32B 2307/584* (2013.01); *B32B 2307/732* (2013.01); *B32B 2307/744* (2013.01); *B32B 2425/00* (2013.01); *C09J 2301/208* (2020.08); *C09J 2301/304* (2020.08)

(56) References Cited

U.S. PATENT DOCUMENTS

| | | | | |
|---|---|---|---|---|
| 9,242,436 | B1* | 1/2016 | Hallman | B32B 27/36 |
| 9,466,019 | B2* | 10/2016 | Blum | G06K 19/07722 |
| 2003/0022973 | A1* | 1/2003 | Hung | C08G 18/341 |
| | | | | 524/270 |
| 2003/0038174 | A1* | 2/2003 | Jones | G06K 19/07745 |
| | | | | 361/782 |
| 2005/0242194 | A1* | 11/2005 | Jones | C09J 9/00 |
| | | | | 235/487 |
| 2007/0218792 | A1* | 9/2007 | Walters | B32B 27/285 |
| | | | | 442/104 |
| 2011/0031319 | A1* | 2/2011 | Kiekhaefer | G06K 19/07722 |
| | | | | 235/492 |
| 2012/0038445 | A1* | 2/2012 | Finn | G06K 19/07783 |
| | | | | 336/105 |
| 2013/0042966 | A1* | 2/2013 | Look | B60R 13/105 |
| | | | | 156/227 |
| 2015/0178616 | A1* | 6/2015 | Blum | G06K 19/07722 |
| | | | | 235/488 |
| 2015/0227829 | A1* | 8/2015 | Finn | B42D 15/00 |
| | | | | 438/118 |

OTHER PUBLICATIONS

PCT, Notification Concerning Transmittal of International Preliminary Report on Patentability, International Application No. PCT/uS2020/053198, dated Apr. 14, 2022 (12 pages).

* cited by examiner

TRANSACTION CARDS AND SYSTEM

CROSS-REFERENCE TO RELATED APPLICATIONS

This application is a national stage application of International Application No. PCT/US2020/053198, having an International filing date of Sep. 29, 2020, which claims priority to U.S. Provisional Patent Application No. 62/908,179, filed Sep. 30, 2019. The entire disclosures of the aforesaid applications are incorporated herein by reference.

BACKGROUND OF THE INVENTIONS

(1) Field

The present inventions relate generally to transaction cards and, more particularly, to transaction and proximity cards having an improved construction and systems for utilizing such cards.

(2) Related Art

Transaction cards have been currently adapted for a wide variety of uses, most commonly as a method of payment in commercial transactions. For example, a user may purchase a fare for transportation at a kiosk.

The growing popularity of near field communication (NFC) technologies such as radio-frequency identification (RFID) tags has resulted in its implementation in proximity cards as well. The kiosk may dispense a NFC-containing card with the number of uses stored within. The user may quickly pay for the transportation by simply scanning the card upon entering the vehicle. Ideally, these cards should be cheaply produced, such that when the card expires it may simply be disposed of.

Proximity cards incorporating NFC technologies have been limited in design due to structural constraints. The proximity cards must be built with sufficient durability such that the RFID tags contained within do not become destroyed and nonfunctional with normal wear and tear. These cards have been required to be of higher thickness due to the multiple layers needed to accommodate its use as a NFC device.

Thus, there remains a need for new and improved transaction and proximity cards and systems which includes a card having only one top ply and only one bottom ply and a layer of high elongation adhesive between each of the only one top ply and the only one bottom ply which reduces the cost to produce the cards while, at the same time, provides a level of appearance, strength and durability comparable or greater than conventional multilayer stacked cards.

SUMMARY OF THE INVENTIONS

The present inventions are directed to transaction and proximity cards having an improved construction and systems for utilizing such cards. The card system includes a card having only one top ply and only one bottom ply and a layer of high elongation adhesive between each of the only one top ply and the only one bottom ply wherein the layer is applied at between about $110\times10^{-6}$ pounds per $in^2$ and $170\times10^{-6}$ pounds per $in^2$. Preferably, the layer is uniformly applied at greater than about 25% coverage. In one proximity card embodiment, the card further includes at least one inlay between the only one top ply and the only one bottom ply and a layer of high elongation adhesive between each of the only one top ply and the only one bottom ply and the at least one inlay. In addition, the transaction card system includes card dispensers adapted to dispense the cards.

In one embodiment, the high elongation adhesive is a reactive hot melt polyurethane adhesive. Also, the reactive hot melt polyurethane adhesive may be polymerized in the presence of moisture.

In one embodiment, the reactive hot melt polyurethane adhesive has a glass transition temperature Tg less than about 32 degrees F. (0 degrees C.) as tested according to ASTM E1356-08(2014). In another embodiment, the reactive hot melt polyurethane adhesive has a glass transition temperature Tg less than about 15 degrees F. (−10 degrees C.) as tested according to ASTM E1356-08(2014). In still another embodiment, the reactive hot melt polyurethane adhesive has a glass transition temperature Tg of about 5 degrees F. (−15 degrees C.) as tested according to ASTM E1356-08(2014).

In one embodiment, the reactive hot melt polyurethane adhesive has a tensile strength greater than about 1500 psi (10 MPa) as tested according to ASTM D638-10. In another embodiment, the reactive hot melt polyurethane adhesive has a tensile strength greater than about 2500 psi (17 MPa) as tested according to ASTM D638-10. In still another embodiment, the reactive hot melt polyurethane adhesive has a tensile strength of about 3000 psi (20 MPa) as tested according to ASTM D638-10.

In one embodiment, the reactive hot melt polyurethane adhesive has an elongation greater than about 500% as tested according to ASTM D638-10. In another embodiment, the reactive hot melt polyurethane adhesive has an elongation of about 600% as tested according to ASTM D638-10.

Each of the reactive hot melt polyurethane adhesive layers may be about one mil in thickness per layer.

In one embodiment, the at least one inlay is an RFID tag. The RFID tag may be a near field tag. The at least one inlay may be about 2½ mils in thickness.

In one embodiment, the total thickness of the card is between about 5 and 35 mils. In another embodiment, the total thickness of the card is about 30 mils.

The card also may be a die cut card.

In one embodiment, the card dispenser is a magazine fed card dispenser. The magazine fed card dispenser may include a feed magazine, at least one feed roll, and a metering gate. In another embodiment, the card dispenser is a roll stock card dispenser.

The card system may further includes a card initialization module. The card initialization module may include a cut card on roll mechanism, feed rollers, printer and delivery chute.

The card may be formed of paper, plastic and combinations thereof. In one embodiment, the plastic is a thermoplastic. The thermoplastic may be selected from the group consisting of polyester, polypropylene, PVC and mixtures thereof.

In one embodiment, the only one top ply and the only one bottom ply are between about 1½ mils and about 20 mils in thickness per ply.

The card may further include a coating for providing scratch resistance during normal use of the card, wherein the coating is applied to at least one outer surface of one of the only one top ply and the only one bottom ply.

The card may further include a coating for providing sticking resistance between adjacent cards when the card is dispensed, wherein the coating is applied to at least one outer surface of one of the only one top ply and the only one bottom ply.

The card may further include a coating for reducing the coefficient of friction between adjacent cards when the card is dispensed, wherein the coating is applied to at least one outer surface of one of the only one top ply and the only one bottom ply.

The card may further include indicia applied to at least one outer surface of one of the only one top ply and the only one bottom ply. The indicia may include identification, customer name, disclaimers on back, customer logo, dollar amount, signature panel, time period for use, and combinations thereof.

Accordingly, one aspect of the present inventions is to provide a transaction card system, the card includes (a) only one top ply; (b) only one bottom ply; and (c) a layer of high elongation adhesive between the only one top ply and the only one bottom ply wherein the layer is applied at between about $110 \times 10^{-6}$ pounds per in$^2$ and $170 \times 10^{-6}$ pounds per in$^2$.

Another aspect of the present inventions is to provide a proximity card, the card includes (a) only one top ply; (b) only one bottom ply; (c) at least one inlay between the only one top ply and the only one bottom ply; and (d) a layer of high elongation adhesive between each of the only one top ply and the only one bottom ply and the at least one inlay wherein the layer is applied at between about $110 \times 10^{-6}$ pounds per in$^2$ and $170 \times 10^{-6}$ pounds per in$^2$.

Still another aspect of the present invention is to provide a transaction card system, the card system includes (a) a card having (i) only one top ply, (ii) only one bottom ply; (iii) at least one inlay between the only one top ply and the only one bottom ply; and (iv) a layer of high elongation adhesive between each of the only one top ply and the only one bottom ply and the at least one inlay wherein the layer is applied at between about $110 \times 10^{-6}$ pounds per in$^2$ and $170 \times 10^{-6}$ pounds per in$^2$; and (b) a card dispenser adapted to dispense the card.

These and other aspects of the present invention will become apparent to those skilled in the art after a reading of the following description of the embodiments when considered with the drawings.

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
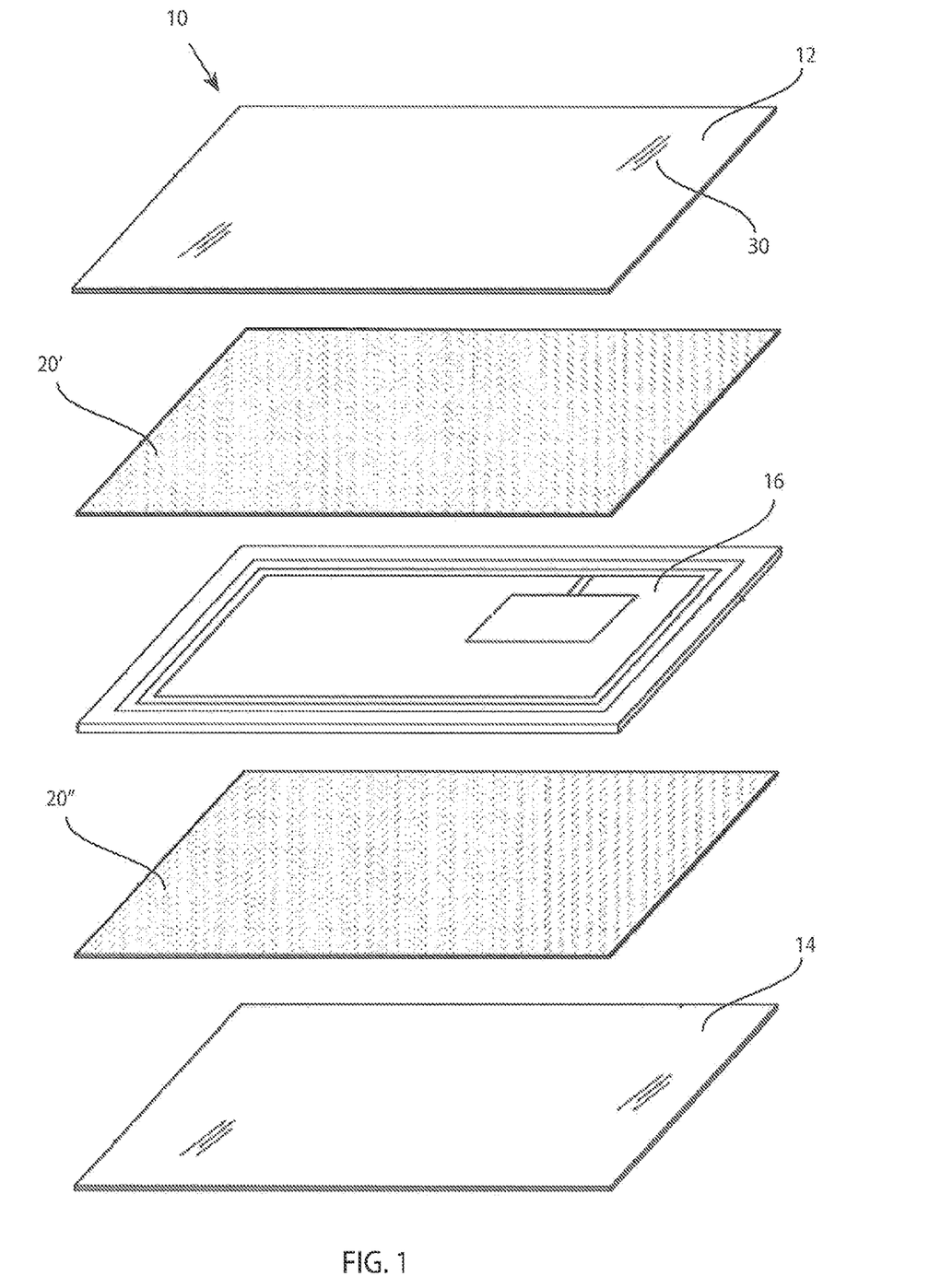
FIG. 1 is an exploded view of a proximity card with a NFC device constructed according to the present inventions.
Figure 2:
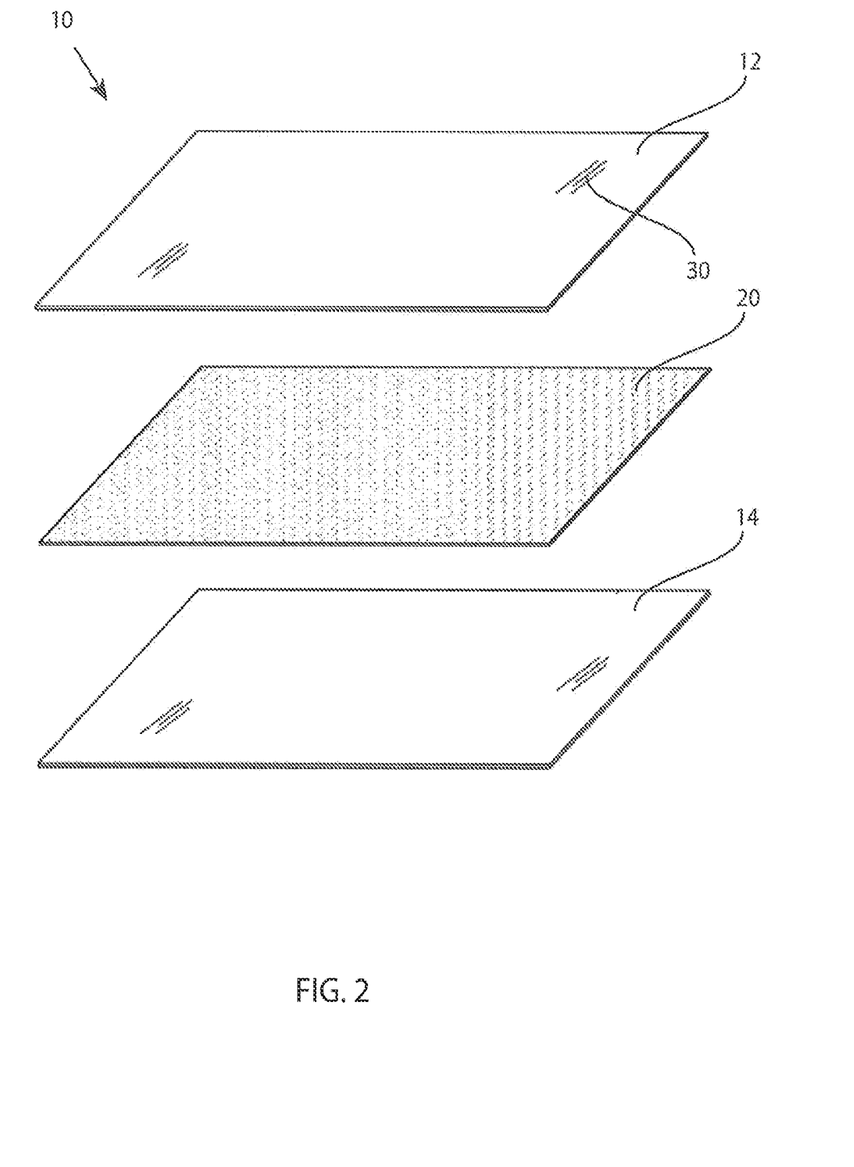
FIG. 2 is an exploded view of an alternative embodiment of the present inventions for a proximity card without a NFC device.

Referring now to the drawings in general and FIG. 1 in particular, it will be understood that the illustrations are for the purpose of describing embodiments of the inventions and are not intended to limit the inventions thereto. As best seen in FIG. 1, one embodiment of a proximity card, generally designated 10, is shown constructed to the present inventions in an exploded view. An alternative embodiment of the present inventions is shown in FIG. 2.

The card 10 includes a top ply 12, a bottom ply 14, an inlay 16 sandwiched between the top ply 12 and bottom ply 14, a layer of adhesive 20' applied between top ply 12 and one face of the inlay 14, and another layer of adhesive 20" applied between bottom ply 14 and the opposing face of the inlay 16. The card 10 may be formed of paper, plastic and combinations thereof. The plastic may be a thermoplastic such as polyester, polypropylene, PVC and mixtures and combinations thereof. Each ply may further include a coating 30 on its outer surface to provide scratch resistance 30', sticking resistance 30", to reduce the coefficient of friction between adjacent cards when the card is dispensed 30''', and any combination of coatings thereof. The card 10 may be die cut.

Figure 3A:
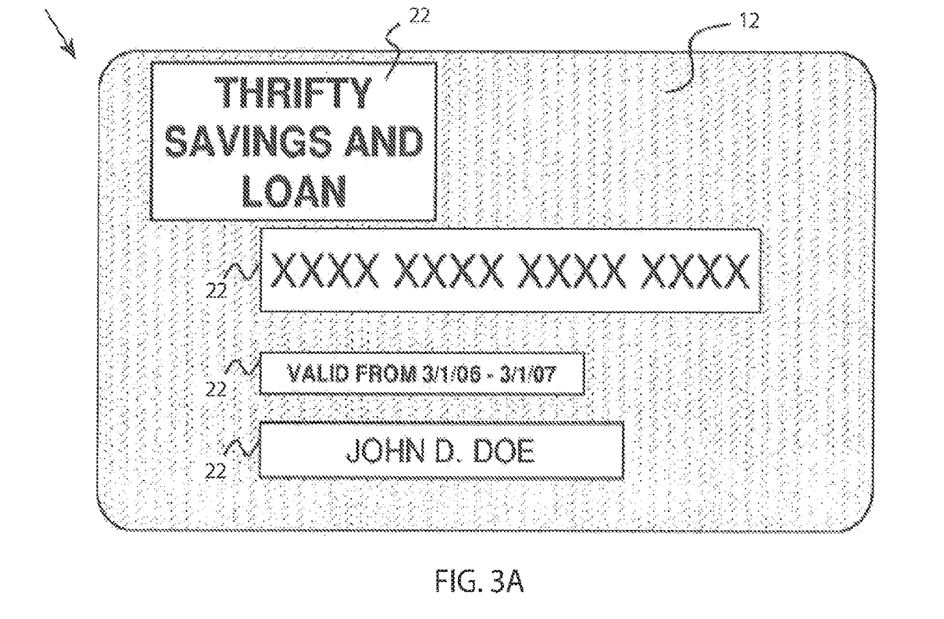
FIG. 3A is a front view of the proximity card shown in FIG. 1.
Figure 3B:
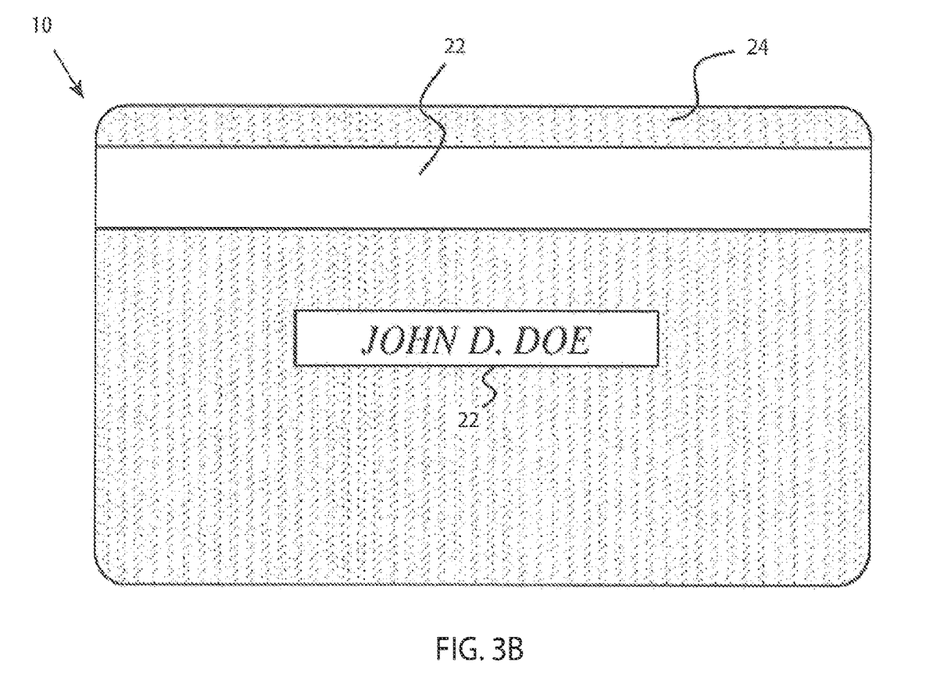
FIG. 3B is a back view of the proximity card shown in FIG. 1.

As shown in FIGS. 3A and 3B, the card 10 may include indicia 22 applied to the outer surface of the top ply 12, bottom ply 14, or both. Any type of indicia 22 may be applied to the card, including identification, customer name, disclaimers, customer logo, dollar amounts, signature panel, time periods for use, and combinations thereof.

One embodiment of the card 10 is a proximity card that includes a radio-frequency identification (RFID) tag as an inlay 16. The RFID tag may be a near field tag that can utilize either high frequencies (HF) or ultra high frequencies (UHF). Cards containing RFID tags may be used for a variety of purposes, such as wireless payments for commercial transactions, transportation fares, or security clearance.

Figure 4:
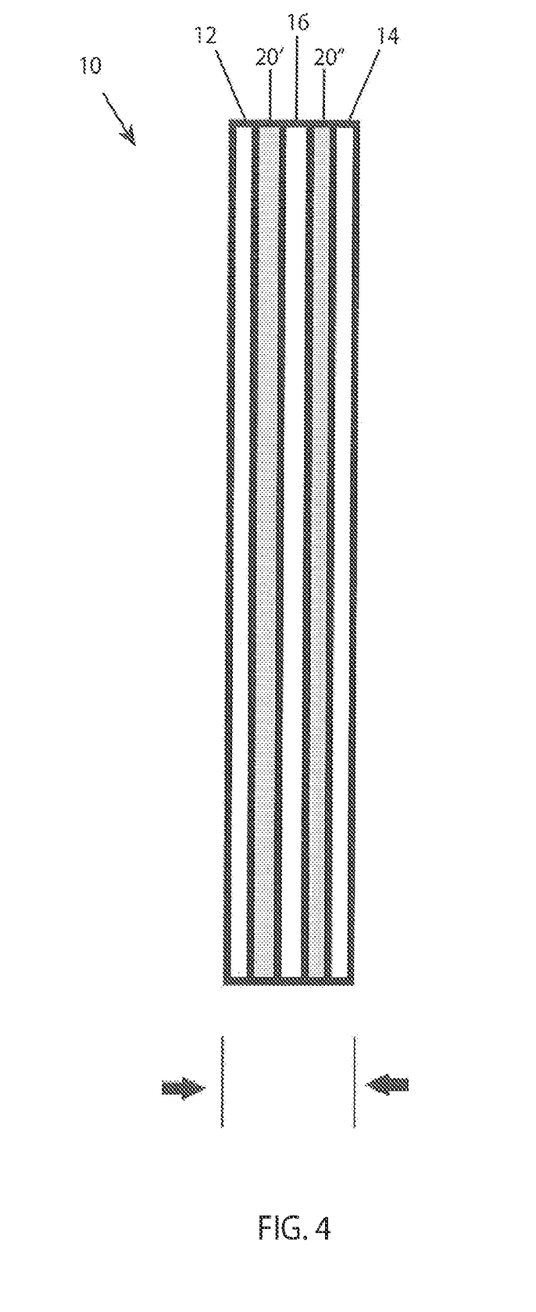
FIG. 4 is a cross-sectional view of the proximity card shown in FIGS. 3A and 3B.

The implementation of RFID tags within cards have traditionally required thick cards to prevent damage to the RFID tag during normal handling. However, the use of a high elongation adhesive enables the production of cards with a lower thickness. Turning to FIG. 4, the card 10 may have a total thickness between about 5 and 35 mils. In one embodiment, the total thickness of the card is about 30 mils.

The top 12 or bottom ply 14 may be between about 1.5 mils to about 20 mils in thickness per ply. Each layer of adhesive 20 may be about 1 mil in thickness. Each layer of inlay 16 may be between 2 to 3 mils in thickness.

Figure 5:
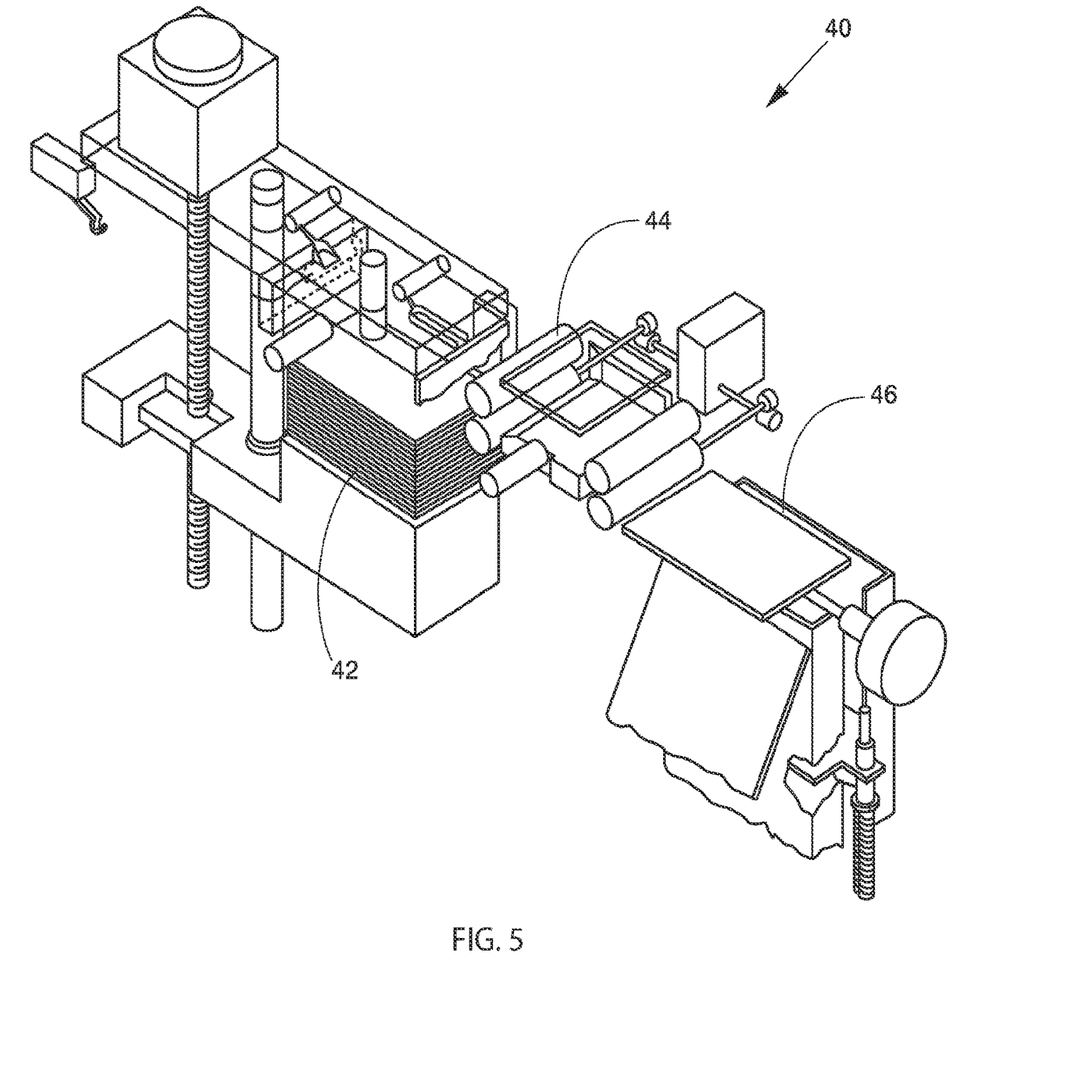
FIG. 5 is a perspective view of one embodiment of a magazine fed card dispenser constructed according to the present inventions.
Figure 6:
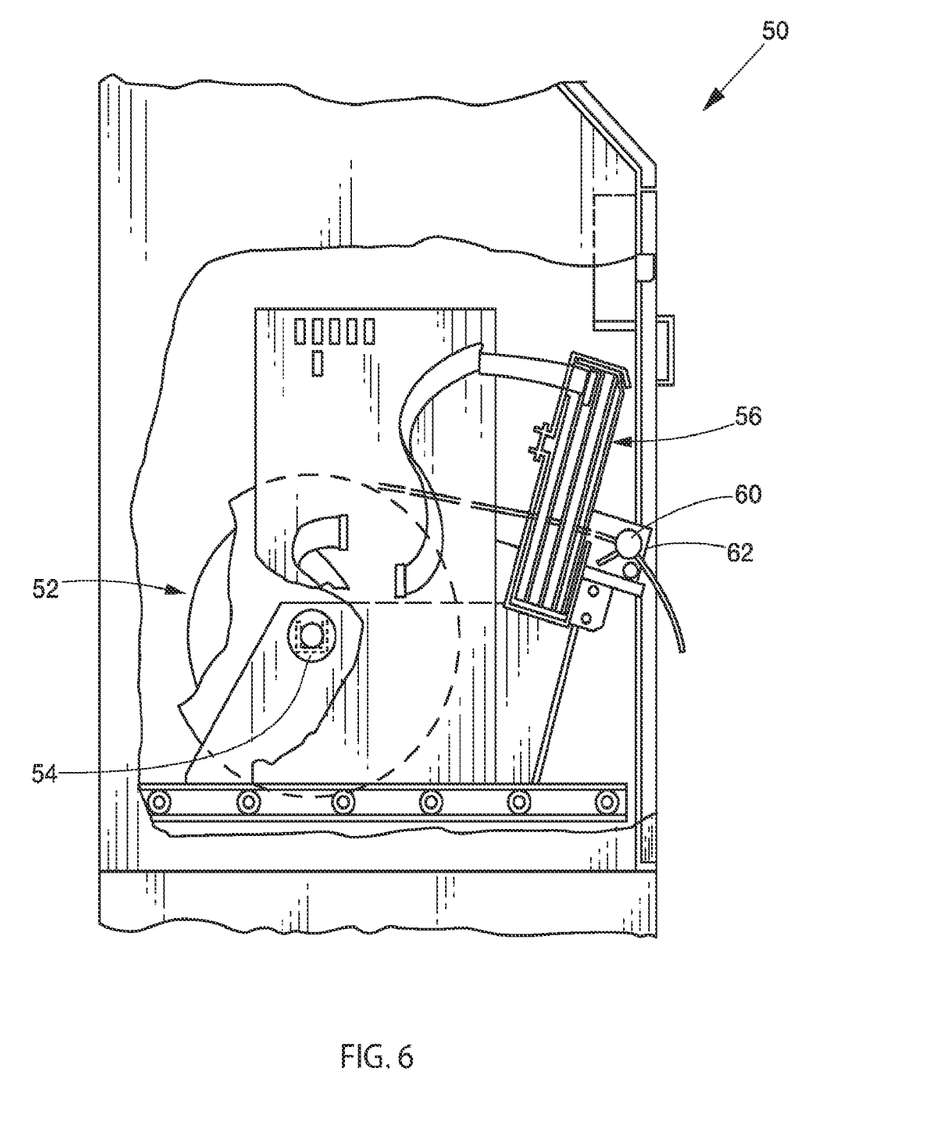
FIG. 6 is a cross-sectional view of one embodiment of a roll card dispenser constructed according to the present inventions.

A variety of dispensers may be utilized to label and distribute cards with the improved properties as disclosed herein. FIG. 5 illustrates one embodiment where the dispenser is a magazine fed card dispenser 40. The magazine fed card dispenser 40 may include a feed magazine 42, at least one feed roll 44 and a metering gate 46. In another embodiment, the dispenser may be a roll card dispenser 50 as shown in FIG. 6. The roll card dispenser 50 may include a card initialization module comprising of a card roll stock 52, a feed roller 54, a printer 56, a card cutter 60 and a delivery chute 62.

The adhesive 20 applied in the present inventions is a high elongation adhesive. One example of a high elongation adhesive is a reactive hot melt polyurethane adhesive that may be polymerized in the presence of moisture. The reactive hot melt polyurethane adhesive has a glass transition temperature (Tg) less than about 32 degrees Fahrenheit (0 degrees Celsius) as tested according to ASTM E1356-08 (2014). In one embodiment, the reactive hot melt polyurethane adhesive has a Tg less than about 15 degrees Fahrenheit (−10 degrees Celsius). In another embodiment, the reactive hot melt polyurethane adhesive as a Tg less than about 5 degrees Fahrenheit (−15 degrees Celsius).

The high elongation adhesive has a tensile strength greater than about 1500 psi (10 MPa) as tested according to ASTM D638-10. In one embodiment, the adhesive has a tensile strength greater than about 2500 psi (~17 MPa). In another embodiment, the adhesive has a tensile strength greater than about 3000 psi (~20 MPa). In one embodiment, the adhesive has an elongation greater than about 500% as tested according to ASTDM D638-10. In another embodiment, the adhesive has an elongation of about 600%.

Figure 7:
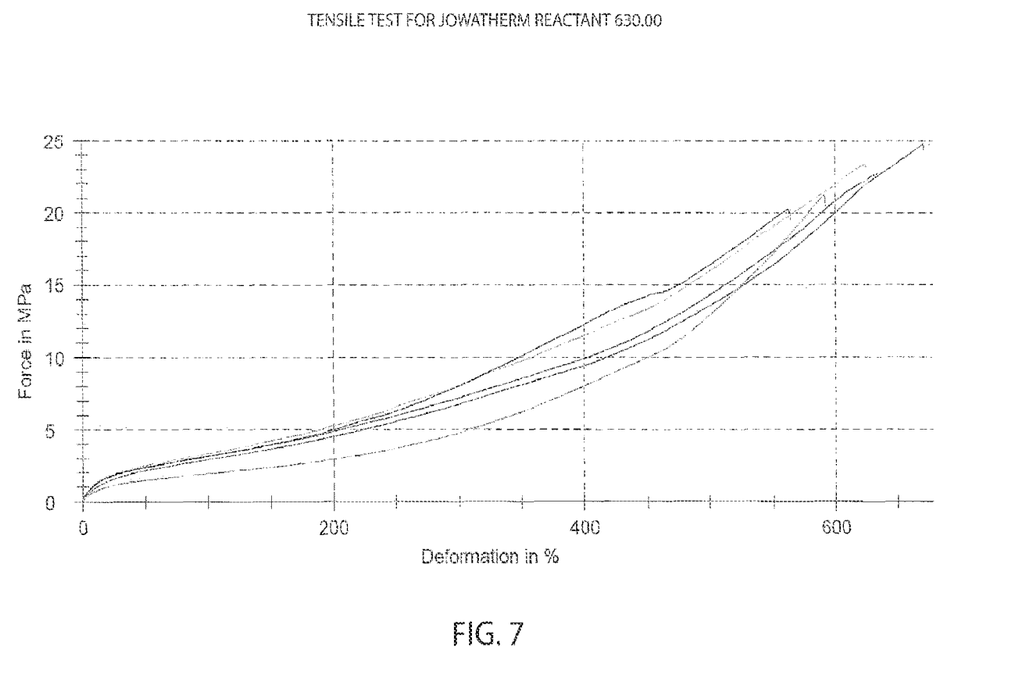
FIG. 7 is a graph of tensile test results for an acceptable PUR adhesive illustrating its low initial tensile value and wide range of elongation.

One example of a reactive hot melt polyurethane (PUR) adhesive is Jowatherm Reactant 630.00, available for purchase from Jowat Adhesives. A useful test for measuring the tensile properties of an adhesive is the dog bone shape test as outlined in ASTM D-638-10. Turning first to Table 1, deformation tests were conducted on samples containing the 630.00 adhesive at 0.6 millimeters thick with a 50 mm/min test speed. FIG. 7 is a plot showing the amount of force required to deform the material over the percent deformation of the material. The average change in deformation prior to the material breaking (denoted as dL (Break) in Table 1) was 617.5%. The average force required to break the material ($F_{max}$) was 22.46 MPa. The 630.00 adhesive thus retains high tensile strength while exhibiting high elasticity and elongation over a wide range.

Figure 8:
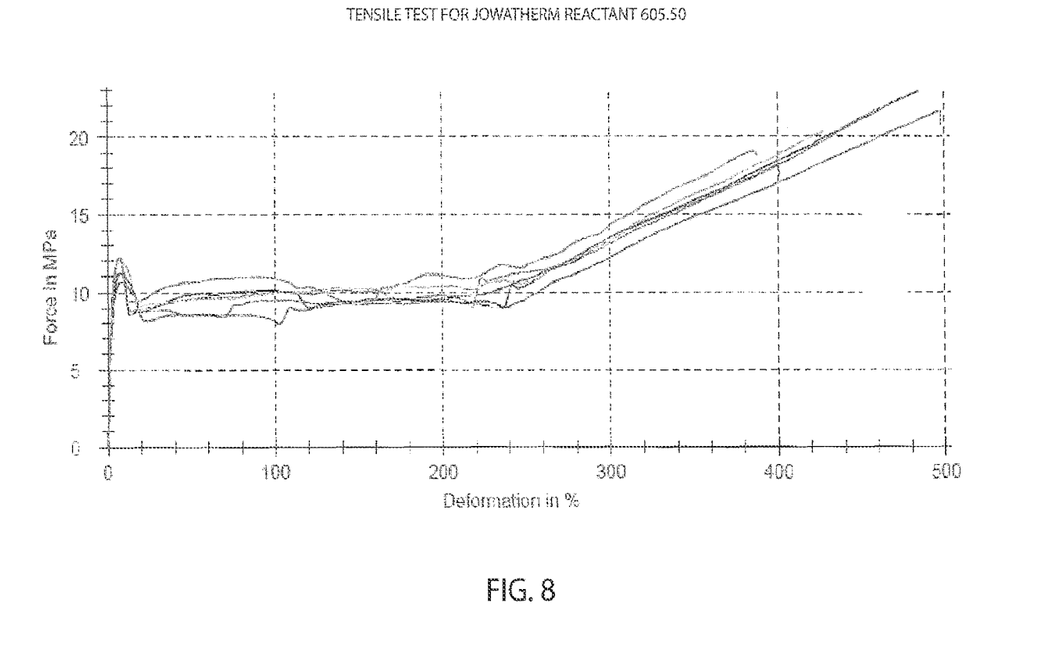
FIG. 8 is a graph of tensile test results for an unacceptable PUR adhesive illustrating its higher initial tensile value and lower range of elongation.

In comparison, Table 2 provides tensile test results for an unacceptable adhesive (Jowatherm Reactant 605.50) that possesses higher initial tensile strength and a lower elongation range less suitable for use in the present inventions. As shown in FIG. 8, the 605.50 adhesive possesses high tensile strength but exhibits lower elasticity in comparison to the 630.00 adhesive. While the average $F_{max}$ required to break the material 20.80 MPa, the average dL (Break) was 445.5%.

TABLE 1

Dog bone shape test (according to ASTM D-638-10) results for 630.00 adhesive

| Part No. | $F_{max}$ N | $F_{max}$ 2 MPa | $F_{Break}$ N | dL (Break) % | $a_0$ mm |
|---|---|---|---|---|---|
| 1 | 79.2 | 23.36 | 76.4 | 625.3 | 0.53 |
| 2 | 90.1 | 22.70 | 89.4 | 634.7 | 0.62 |
| 3 | 101 | 24.75 | 99.7 | 670.9 | 0.64 |
| 4 | 54.4 | 20.25 | 52.3 | 564.5 | 0.42 |
| 5 | 67.9 | 21.22 | 65.5 | 592.0 | 0.5 |

TABLE 2

Dog bone shape test (according to ASTM D-638-10) results for 605.50 adhesive

| Part No. | $F_{max}$ N | $F_{max}$ 2 MPa | $F_{Break}$ N | dL (Break) % | $a_0$ mm |
|---|---|---|---|---|---|
| 1 | 90.2 | 21.67 | 86.1 | 497.8 | 0.65 |
| 2 | 66.6 | 18.26 | 63.8 | 401.2 | 0.57 |
| 3 | 92.5 | 22.95 | 92.5 | 484.3 | 0.63 |
| 4 | 76.7 | 20.32 | 76.6 | 427.4 | 0.59 |
| 5 | 85.1 | 22.54 | 85.1 | 474.7 | 0.59 |
| 6 | 69.5 | 19.06 | 68.6 | 387.8 | 0.57 |

A "pass-fail" bending test was used for screening the elongation and tensile strength properties of cards constructed according to the present inventions. Specifically, bending tests were conducted for cards produced with a high elongation adhesive and possessing thicknesses of either 15, 27 or 76 mils to determine whether the NFC cards remained functional and could be read. The bending tests were performed on 50 cards for 15 and 27 mils each, while bending tests were performed on 10 cards that were 76 mils thick. Each card was bent over and around rods of decreasing diameters. While all the 15 mil cards were capable of bending around rods with a diameter less than 1 inch and remained functional, neither the 27 mil nor the 76 mil cards were capable of bending around rods with a diameter less than 1 inch and remain functional and no data could be collected for those points.

Turning to Table 3, it shows the number of NFC cards (out of the total number performed) that remained functional after being bent around a rod with a specified diameter. While all 27 mil and 15 mil cards constructed according to the present inventions remained functional after each bend test of bending around rods with a diameter down to 1 inch, one of 76 mil cards became nonfunctional after wrapping around a 1-inch diameter rod. Only the 15 mil cards constructed according to the present inventions remained functional after being bent around rods with a diameter of less than 1 inch and remain functional. Accordingly, the results show that a card constructed according to the present inventions and about 30 mil in thickness is capable of withstanding moderate deformation and remaining functional despite the deformation and a card constructed according to the present inventions and about 15 mil in thickness is capable of withstanding extreme deformation and remaining functional despite the deformation.

TABLE 3

Bending test for RFID cards

| Rod Diameter (inches) | 27 mil Card | 15 mil Card | Standard Card (76 mil) |
|---|---|---|---|
| 2 | 50 | 50 | 10 |
| 1.5 | 50 | 50 | 10 |
| 1.25 | 50 | 50 | 10 |
| 1 | 50 | 50 | 9 |
| 0.75 | N/A | 50 | N/A |
| 0.50 | N/A | 50 | N/A |
| 0.25 | N/A | 50 | N/A |

*Data not available where indicated by N/A due to inability of card to bend around rod.

Figure 9:
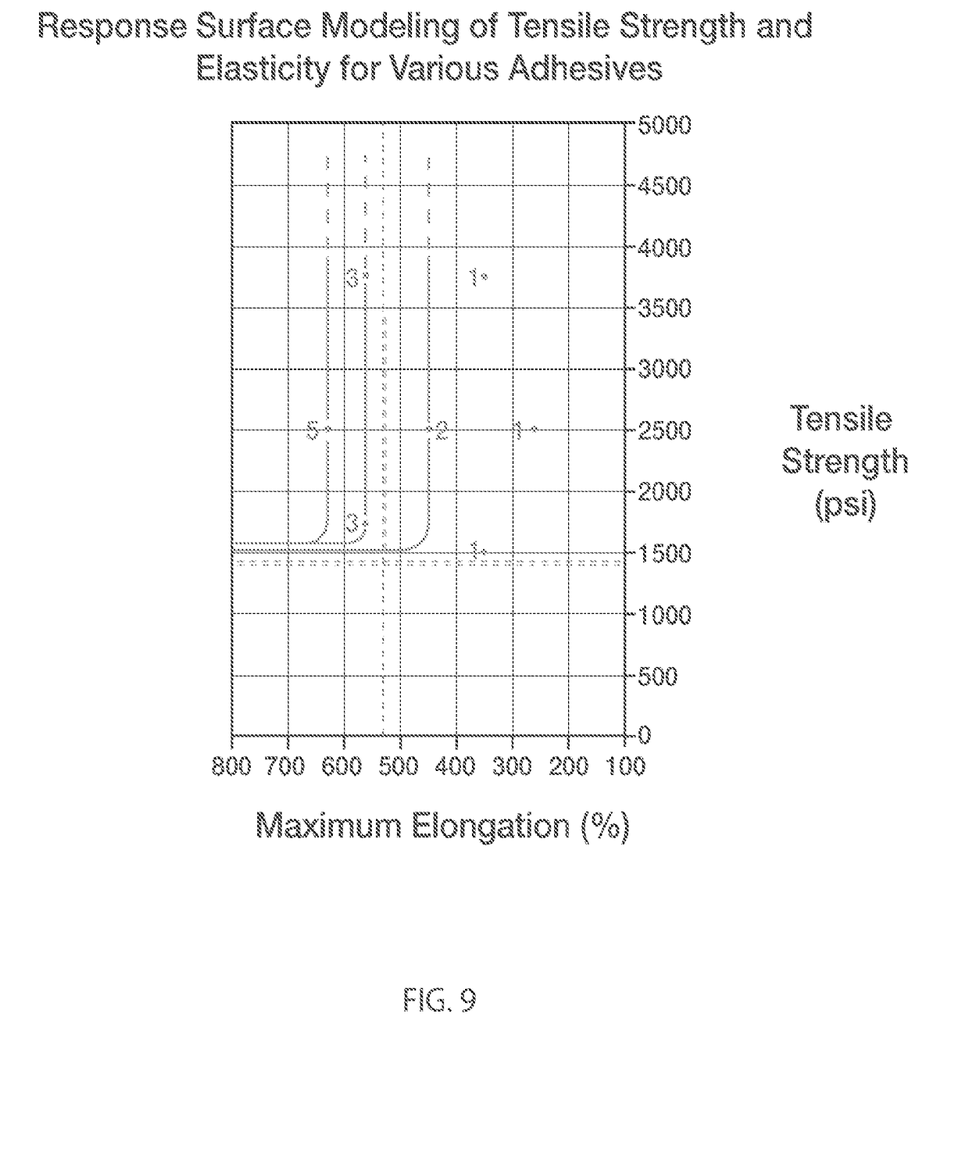
FIG. 9 is a graphical representation of a response surface illustrating the relationship of the elongation and the tensile strength of adhesives on the performance of proximity cards constructed according to the present inventions.

FIG. 9 is a graphical representation of a response surface illustrating the relationship of the elongation and the tensile strength of adhesives on the performance of proximity cards constructed according to the present inventions. The response surface provides a visual illustration of the effects of both the elongation and the tensile strength of an adhesive via a two-dimensional surface plot of a three-dimensional surface.

Accordingly, the expected characteristics of various adhesives, such as hot melt PUR adhesives, were plotted and zones on the response surface were ranked from 1 to 5 with 1 being the poorest performing proximity cards and 5 being the best performing proximity cards in terms of durability of an embedding RFID tag and the resistance of the card to separation of layers.

As can be seen, adhesives having both sufficiently high tensile strength to resist peeling and sufficiently high elongation to prevent damage to the embedded RFID tag were the best performing, while adhesives having lower tensile strength and/or lower percent elongation were less desirable since either peeling or damage to the embedded RFID tag occurred.

The boundary conditions in FIG. 9 are denoted with dashed lines, and indicate the minimum tensile strength and the satisfactory percent elongation of adhesives for use in the present inventions. According to the ASTM D638-10 dog bone shape test, the percent elongation represents the bend of the adhesive material as a force is applied to the material. The maximum elongation derived from this test is the percent elongation value prior to the material breaking. Maximum elongation is a measure of elasticity of the adhesive and is inversely proportional to the adhesive's modulus of elasticity. Therefore, adhesives having a lower modulus of elasticity would have a higher maximum elongation than adhesives having a higher modulus of elasticity.

As can be seen in FIG. 9, the tensile strength of an adhesive used in the present inventions preferably would be greater than about 1500 psi (10 MPa) and have a maximum elongation of at least about 500% as tested according to ASTM D638-10.

In practice, other issues do occur in manufacturing. First, reactive PUR adhesives expand significantly when cured. If applied thickness is 5½ mils at press run, thickness after expansion due to curing is about an additional 5 to 7 mils. Also, the adhesive thickness after expansion due to curing is very dependent on the applied thickness as will be discussed in more detail below with respect to FIG. 10.

During manufacturing, after the PUR adhesive is applied, the product goes through a pair of marriage rollers before subsequently being cured over about a 3 day period of time. Marriage rollers are low-pressure rollers that do not compress the PUR adhesive further. The marriage rollers only act to ensure that the top ply and bottom ply have been adhered to one another and do not exert sufficient pressure to spread the PUR adhesive. Further, reducing uniform coverage (%) using stripes or dots/embossed rollers also will not reduce thickness as the adhesive is cured and may instead introduce voids or streaks or inadequate peel strength between plys. So, neither of these approaches would be helpful in controlling the effects of adhesive expansion on final product dimensions.

Furthermore, thickness changes may also occur when the PUR adhesive is cured on a specific material. For example, on paper the PUR adhesive will expand only about 2 mils while on PET, the PUR adhesive will expand about 3 mils. This variation is not very much difference and is small enough to stay within specifications for various materials. Accordingly, changes to the substrate material itself does not appear to provide a way to control excessive PUR expansion with curing.

Figure 10:
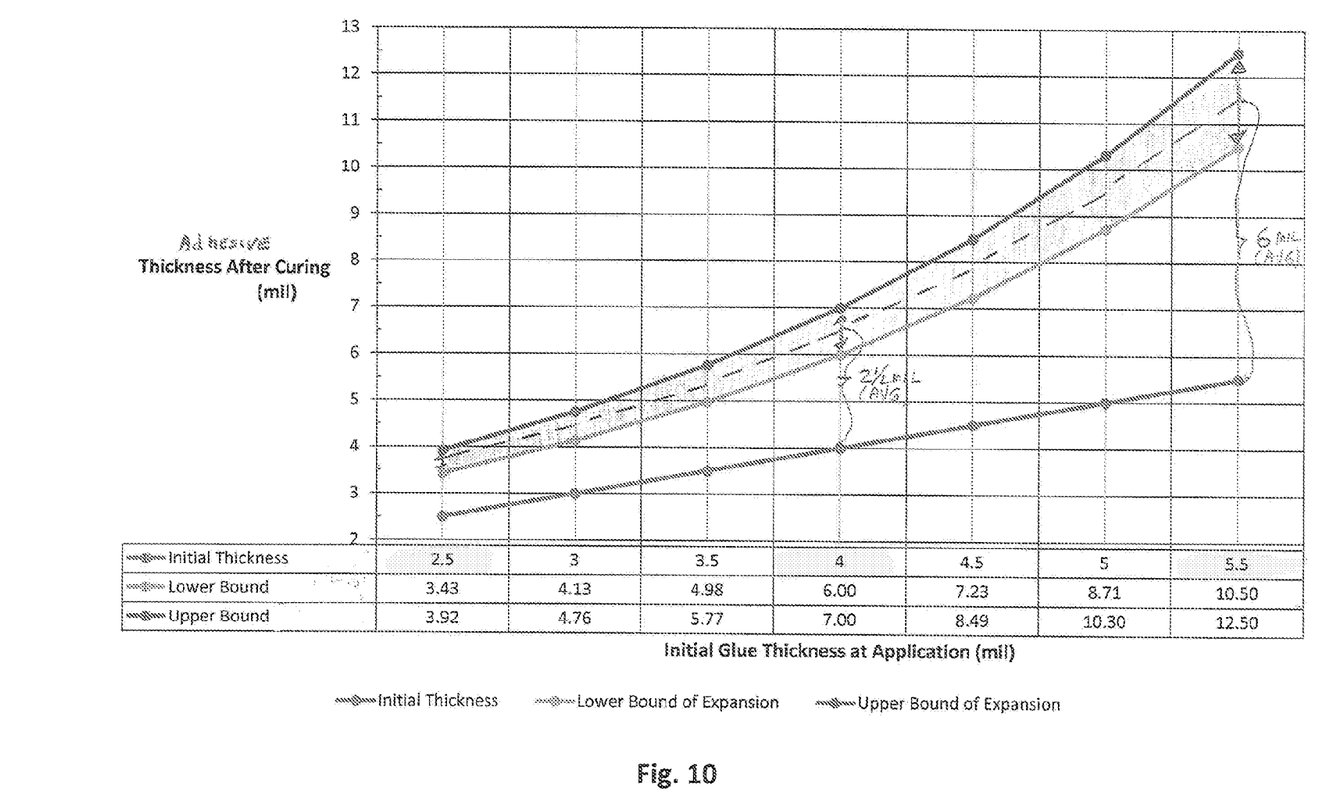
FIG. 10 is a graph of adhesive thickness as applied at press run versus adhesive thickness after curing for a PUR adhesive illustrating its excessive expansion for a minor increase in adhesive thickness as applied at press run.

These relationships may be better understood by turning to FIG. 10, where there is shown a graph of adhesive thickness as applied at press run versus adhesive thickness after curing. The curve for Adhesive Thickness After Curing illustrates a PUR adhesive's excessive expansion for minor increases in adhesive thickness as applied at press run. Specifically, when adhesive thickness is increased linearly, adhesive thickness after curing increases geometrically In one example illustrated in FIG. 10, 300,000 tickets were run per drum of 400 pounds of PUR adhesive. In another example, 400,000 tickets were run per drum of PUR adhesive. 300,000 tickets equals 5½ mils PUR thickness as applied at press run (Example One) and 400,000 tickets equals 4 mils PUR thickness as applied at press run (Example Two).

For Example One, 5½ mils as applied at press run results in a thickness after expansion due to curing of about an additional 5 to 7 mils. Thus, the final thickness after curing of Example One is between at least 10½ to 12½ mils. However, laying down 4 mils PUR thickness as applied at press run in Example Two results in a thickness after expansion due to curing of only about an additional 2 to 3 mils. Thus, the final thickness after curing of Example Two is only between about 6 to 7 mils due to significantly less expansion at the slightly lower thickness as applied at press run.

As discussed briefly above and as seen in FIG. 10, while the adhesive thickness as applied at press run is increasing linearly, the adhesive thickness as cured is increasing geometrically. This is primarily because while the reactive PUR adhesive must expand as it cures, it is constrained by the card dimensions to expand only in one direction. However, reducing the applied PUR from recommended levels would not be expected to produce an acceptable product that also has adequate peel strength between plys. This is due in part to PUR adhesives act differently than convention adhesives where a thinner layer of adhesive usually forms a stronger joint for most applications. PUR adhesives do not behave that way. For example, burst strength is affected by PUR adhesive thickness as applied. As measured below and as used herein, "burst strength" is the tensile strength in pounds as measured by a Chatillon model TCD200-MH series Digital Force Tester operated with a crosshead speed of 12 inches per minute. Chatillon is a division of AMETEK Measurement & Calibration Technologies, 8600 Somerset Drive, Largo, FL 33773.

In Example Two, for PUR adhesive thickness at 4 mils thickness as applied at press run, burst strength was about 18.5 pounds average with a 14 to 25 pound range. After a 3 day curing time, the burst strength was about 20.5 pounds with a 14 to 27 pound range. This was only about a 2 pound increase in burst strength after curing.

In Example One, for PUR adhesive thickness at 5½ mils thickness as applied at press run, burst strength was about 20 pounds average with a 15 to 25 pound range. After a 3 day curing time, the burst strength was 26 pounds average with a 14 to 38 pound range. This was about a 6 pound average increase in burst strength after a 3 day curing time.

However, as can be seen in FIG. 10, the resulting product of Example One would be out of dimensional specifications because of the excessive expansion of the PUR adhesive during curing.

Figure 11:
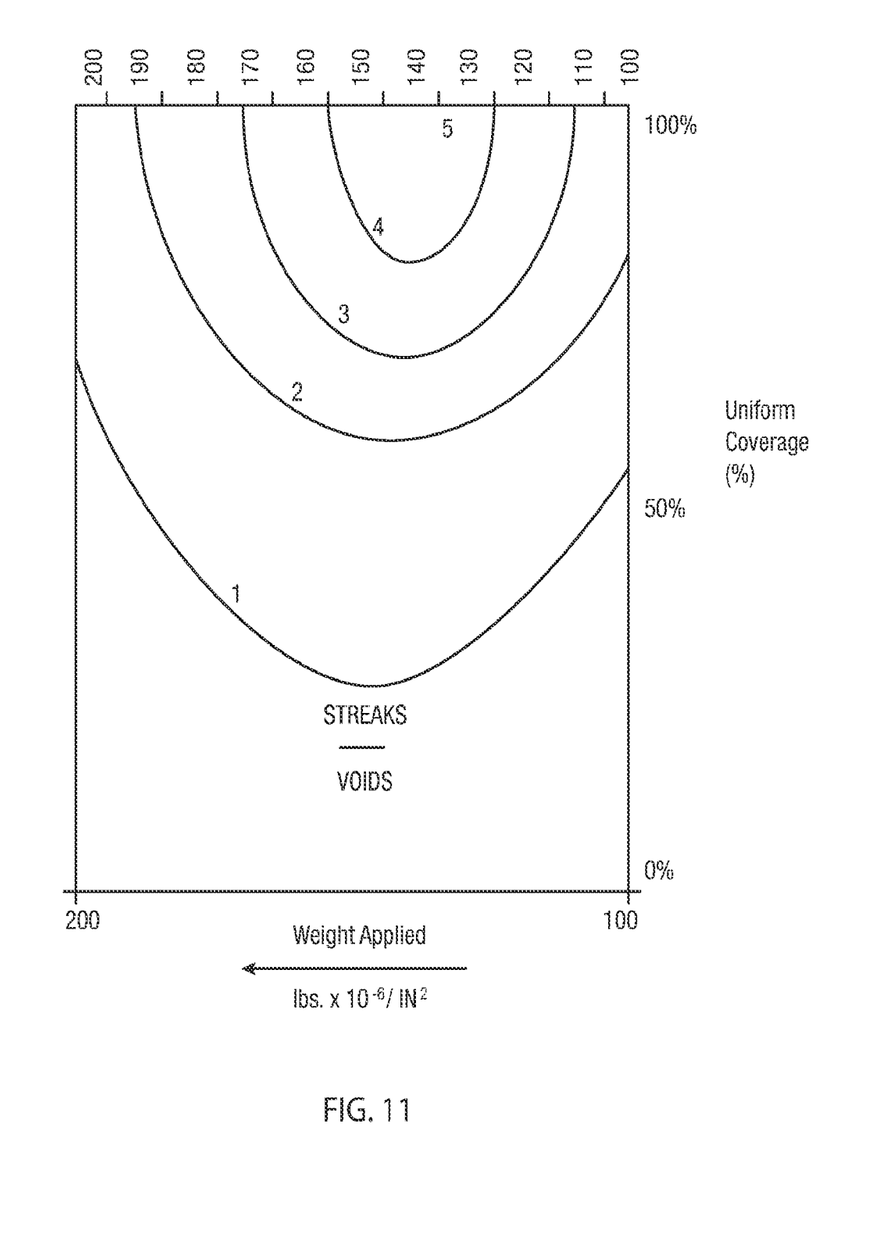
FIG. 11 is a graphical representation of a response surface illustrating the relationship of adhesive weight per in$^2$ applied at press run and coverage on the performance of proximity cards constructed according to the present inventions.

Turning now to FIG. 11, there is shown a graphical representation of a response surface illustrating the relationships of both adhesive weight per in$^2$ applied at press run and uniform coverage (%) on the performance of proximity cards constructed according to the present inventions.

It can be seen that there are other manufacturing issues. Specifically, the lower portion of FIG. 11 shows that a minimum coverage of about 25% is necessary to produce an acceptable product without visual defects or inadequate peel strength between the plys. This "minimum" coverage requirement is similar to the minimum Tensile Strength requirement discussed with respect to FIG. 9 above Reducing the % coverage area less than about 25% by laying down the PUR adhesive stripes or dots/embossed rollers also may cause air bubbles, streaks or voids in the as applied adhesive coverage. Also, reducing the % coverage area less than about 25% by laying down the PUR adhesive stripes or dots/embossed rollers also causes air bubbles, streaks or void in the as cured adhesive coverage. This is because the PUR adhesive as it cures will not reduce these coverage defects; once the coverage defects are laid down, the defects are there to stay in the as cured adhesive.

Accordingly, the PUR adhesive curing expansion problem is substantially independent of the problem caused by too low % coverage although somewhat related in that the lower % coverage may be lower weight per in$^2$ as applied but not a lower thickness as applied depending on the type of roller being used. For 100% uniform coverage rollers, weight per in$^2$ and thickness as applied at press run are directly related. Turning to the upper portion of FIG. 11, there is shown a graphical representation of a response surface illustrating the relationships of the both adhesive weight per in$^2$ applied at press run and uniform coverage (%) on the performance of proximity cards constructed according to the present inventions once the minimum % coverage has been met.

The response surface provides a visual illustration of the effects of PUR adhesive weight per in$^2$ applied at press run via a two-dimensional surface plot of a three-dimensional surface.

In practice, weight per in$^2$ as applied at press run is a more meaningful measurement than thickness as applied since weight per in$^2$ is averaged over an entire run of product rather than at individual thickness measurement points. However, thickness after curing is measured directly over several samples.

Accordingly, the expected characteristics of various weights per in$^2$ of the PUR adhesive were plotted and the zones on the response surface were ranked from 1 to 5 with 1 being the poorest performing proximity cards and 5 being the best performing proximity cards in terms of durability of an embedding RFID tag and the resistance of the card to separation of layers.

As discussed above in FIG. 9, the overall performance measured in terms of durability of an embedding RFID tag and the resistance of the card to separation of layers. Therefore, it was unexpected that reducing PUR adhesive weight per in$^2$ as applied at press run from recommended levels could produce a more desirable product as can be seen in FIG. 11.

The calculations are that at 400,000 tickets per drum, it will be $130 \times 10^{-6}$ lbs. per in$^2$ and at 300,000 tickets per drum, it will be $175 \times 10^{-6}$ lbs. per in$^2$. However, FIG. 11 shows that the overall performance value at $175 \times 10^{-6}$ lbs. per in$^2$ is about "3" while reducing the amount of PUR as applied to about $130 \times 10^{-6}$ lbs. per in$^2$ results in an overall performance value of about "5".

Accordingly, the Example Two produces 25% more tickets without voids or streaks or inadequate peel strength between plys. Specifically, the 25% reduction in applied weight per in$^2$ is also a 25% reduction in as applied adhesive thickness at press run. In addition, as long as greater than about 25% up to 100% of uniform coverage is maintained, the product has acceptable burst strength.

Accordingly, the improved product has a layer of high elongation polyurethane adhesive between each of the only one top ply and the only one bottom ply and the at least one inlay, the layer is applied at between about $110 \times 10^{-6}$ pounds per in$^2$ and $170 \times 10^{-6}$ pounds per in$^2$. In another embodiment, the layer is applied at between about $125 \times 10^{-6}$ pounds per in$^2$ and $155 \times 10^{-6}$ pounds per in$^2$. In still another embodiment, the layer is applied at between about $130 \times 10^{-6}$ pounds per in$^2$.

Certain modifications and improvements will occur to those skilled in the art upon a reading of the foregoing description. By way of example, while the present inventions refer to "proximity cards," it should be understood that the present inventions may also be adapted for cards of any other type of purpose. Further, while the specification discloses two types of dispensers, the card constructed according to the present inventions may be used in conjunction with other compatible dispensers. It should be understood that all such modifications and improvements have been deleted herein for the sake of conciseness and readability but are properly within the scope of the following claims.

We claim:

1. A proximity card, comprising:
   a first ply;
   a second ply;
   at least one inlay between the first ply and the second ply;
   a first layer of high-elongation polyurethane adhesive between the first ply and the at least one inlay, the first layer of high-elongation polyurethane adhesive comprising a weight between about $100 \times 10^{-6}$ pounds per in$^2$ and $200 \times 10^{-6}$ pounds per in$^2$; and
   a second layer of high-elongation polyurethane adhesive between the second ply and the at least one inlay, the second layer of high-elongation polyurethane adhesive comprising a weight between about $100 \times 10^{-6}$ pounds per in$^2$ and $200 \times 10^{-6}$ pounds per in$^2$.

2. The proximity card of claim 1, wherein the high-elongation polyurethane adhesive comprises a reactive hot-melt polyurethane adhesive.

3. The proximity card of claim 1, wherein the at least one inlay comprises an RFID tag.

4. The proximity card of claim 1, further including a substantially scratch-resistant coating, wherein the substantially scratch-resistant coating is applied to an outer surface of at least one of the first ply or the second ply.

5. The proximity card of claim 1, further including a coating for reducing a coefficient of friction between adjacent cards when the proximity card is dispensed, wherein the coating is applied to at least one outer surface of one of the first ply or the second ply.

6. The proximity card of claim 1, further including indicia applied to an outer surface of at least one of the first ply and the second ply.

7. The proximity card of claim 1, wherein the first layer of high-elongation polyurethane adhesive is applied at about 100% coverage, and wherein the second layer of high-elongation polyurethane adhesive is applied at about 100% coverage.

8. A proximity card, comprising:
a first ply;
a second ply;
at least one inlay between the first ply and the second ply;
a first layer of high-elongation polyurethane adhesive between the first ply and the at least one inlay, the first layer of high-elongation polyurethane adhesive comprising a weight between about $50 \times 10^{-6}$ pounds per in$^2$ and $100 \times 10^{-6}$ pounds per in$^2$; and
a second layer of high-elongation polyurethane adhesive between the second ply and the at least one inlay, the second layer of high-elongation polyurethane adhesive comprising a weight between about $50 \times 10^{-6}$ pounds per in$^2$ and $100 \times 10^{-6}$ pounds per in$^2$.

9. The proximity card of claim 8, wherein the high-elongation polyurethane adhesive comprises a reactive hot-melt polyurethane adhesive.

10. The proximity card of claim 8, wherein the at least one inlay comprises an RFID tag.

11. The proximity card of claim 8, further including a substantially scratch-resistant coating, wherein the substantially scratch-resistant coating is applied to an outer surface of at least one of the first ply and the second ply.

12. The proximity card of claim 8, further including a coating for reducing a coefficient of friction between adjacent cards when the proximity card is dispensed, wherein the coating is applied to at least one outer surface of one of the first ply and the second ply.

13. The proximity card of claim 8, wherein the first layer of high-elongation polyurethane adhesive is applied at between about 50% to 100% coverage, and wherein the second layer of high-elongation polyurethane adhesive is applied at between about 50% to 100% coverage.

14. A proximity card, comprising:
a first ply;
a second ply;
at least one inlay between the first ply and the second ply;
a first layer of high-elongation polyurethane adhesive between the first ply and the at least one inlay, the first layer of high-elongation polyurethane adhesive comprising a weight between about $25 \times 10^{-6}$ pounds per in$^2$ and $50 \times 10^{-6}$ pounds per in$^2$; and
a second layer of high-elongation polyurethane adhesive between the second ply and the at least one inlay, the second layer of high-elongation polyurethane adhesive comprising a weight between about $25 \times 10^{-6}$ pounds per in$^2$ and $50 \times 10^{-6}$ pounds per in$^2$.

15. The proximity card of claim 14, wherein the high-elongation polyurethane adhesive comprises a reactive hot-melt polyurethane adhesive.

16. The proximity card of claim 14, wherein the at least one inlay comprises an RFID tag.

17. The proximity card of claim 14, further including a substantially scratch-resistant coating, wherein the substantially scratch-resistant coating is applied to an outer surface of at least one of the first ply and the second ply.

18. The proximity card of claim 14, further including a coating for reducing a coefficient of friction between adjacent cards when the proximity card is dispensed, wherein the coating is applied to at least one outer surface of one of the first ply and the second ply.

19. The proximity card of claim 14, further including indicia applied to an outer surface of at least one of the first ply and the second ply.

20. The proximity card of claim 14, wherein the first layer of high-elongation polyurethane adhesive is applied at between about 25% to 50% coverage, and wherein the second layer of high-elongation polyurethane adhesive is applied at between about 25% to 50% coverage.

* * * * *